United States Patent
Urashita

(10) Patent No.: US 10,706,515 B2
(45) Date of Patent: Jul. 7, 2020

(54) SHADOW REMOVAL VIDEO ANALYSIS SYSTEM

(71) Applicant: NEC Corporation, Minato-ku, Tokyo (JP)

(72) Inventor: Keiichi Urashita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/354,372

(22) Filed: Mar. 15, 2019

(65) Prior Publication Data
US 2019/0213721 A1    Jul. 11, 2019

Related U.S. Application Data

(63) Continuation of application No. 15/117,814, filed as application No. PCT/JP2015/000529 on Feb. 5, 2015.

(30) Foreign Application Priority Data

Feb. 14, 2014    (JP) .................................. 2014-026465

(51) Int. Cl.
*G06K 9/00*    (2006.01)
*G06T 7/136*    (2017.01)
(Continued)

(52) U.S. Cl.
CPC ............ *G06T 5/20* (2013.01); *G06K 9/00771* (2013.01); *G06T 5/001* (2013.01); *G06T 7/254* (2017.01);
(Continued)

(58) Field of Classification Search
CPC ...... G06K 9/00771; G06T 2207/10016; G06T 2207/20008; G06T 5/001; G06T 5/20; G06T 7/254; G06T 7/136
See application file for complete search history.

(56) References Cited

U.S. PATENT DOCUMENTS 6,754,367 B1 *   6/2004   Ito ...................... G06K 9/00771
                                                            348/154
2002/0071034 A1    6/2002   Ito et al.
(Continued)

FOREIGN PATENT DOCUMENTS

JP    2000-322581 A    11/2000
JP    2001-160146 A     6/2001
(Continued)

OTHER PUBLICATIONS

International Search Report for PCT Application No. PCT/JP2015/000529, dated Apr. 21, 2015.
(Continued)

*Primary Examiner* — Kenny A Cese

(57) ABSTRACT

A video analysis system includes: a video data acquiring means that acquires video data; a moving object detecting means that detects a moving object from video data acquired by the video data acquiring means, by using a moving object detection parameter, which is a parameter for detecting a moving object; an environment information collecting means that collects environment information representing an external environment of a place where the video data acquiring means is installed; and a parameter changing means that changes the moving object detection parameter used when the moving object detecting means detects a moving object, on the basis of the environment information collected by the environment information collecting means.

18 Claims, 9 Drawing Sheets

(51) Int. Cl.
  *G06T 5/20* (2006.01)
  *G06T 7/254* (2017.01)
  *G06T 5/00* (2006.01)

(52) U.S. Cl.
  CPC .... *G06T 7/136* (2017.01); *G06T 2207/10016* (2013.01); *G06T 2207/20008* (2013.01)

(56) References Cited

U.S. PATENT DOCUMENTS

| | | | |
|---|---|---|---|
| 2006/0290780 A1 | 12/2006 | Porikli | |
| 2007/0110309 A1* | 5/2007 | Ibrahim | G06T 7/254 |
| | | | 382/171 |
| 2007/0280504 A1* | 12/2007 | Badawy | G06K 9/00711 |
| | | | 382/104 |
| 2009/0087025 A1* | 4/2009 | Ma | G06K 9/00771 |
| | | | 382/103 |
| 2010/0063672 A1 | 3/2010 | Anderson | |
| 2010/0111362 A1 | 5/2010 | Huang et al. | |
| 2010/0231721 A1* | 9/2010 | Meloche | G08G 5/065 |
| | | | 348/159 |
| 2010/0290710 A1 | 11/2010 | Gagvani et al. | |
| 2012/0106797 A1 | 5/2012 | Wang | |
| 2013/0128050 A1 | 5/2013 | Aghdasi et al. | |
| 2013/0136350 A1 | 5/2013 | Pai et al. | |
| 2013/0170557 A1 | 7/2013 | Wang et al. | |
| 2013/0176430 A1 | 7/2013 | Zhu et al. | |
| 2013/0343603 A1* | 12/2013 | Choi | G06T 5/005 |
| | | | 382/103 |
| 2014/0270548 A1 | 9/2014 | Kamiya | |

FOREIGN PATENT DOCUMENTS

| | | |
|---|---|---|
| JP | 2002-074370 A | 3/2002 |
| JP | 2004-007246 | 1/2004 |
| JP | 2004-355139 | 12/2004 |
| JP | 2010-171661 A | 8/2010 |
| JP | 2011-077617 A | 4/2011 |
| JP | 2011-238177 A | 11/2011 |
| JP | 2012-043021 A | 3/2012 |

OTHER PUBLICATIONS

Singapore Office Action for SG Application No. 11201606716V dated Apr. 20, 2017.

U.S. Office Action and PTO-892 for U.S. Appl. No. 15/117,814 dated May 30, 2019.

U.S. Office Action for U.S. Appl. No. 16/354,347 dated Dec. 18, 2019.

* cited by examiner

Fig.4
• LIGHT PLACE (DAYTIME AND THE LIKE)
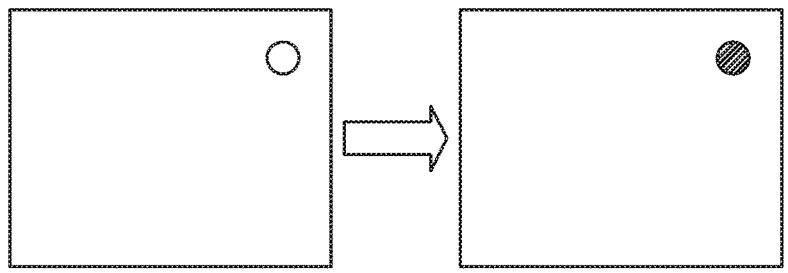
DETECT CHANGE WITH WIDE DISPARITY RANGE TO SOME DEGREE
• DARK PLACE (NIGHTTIME AND THE LIKE)
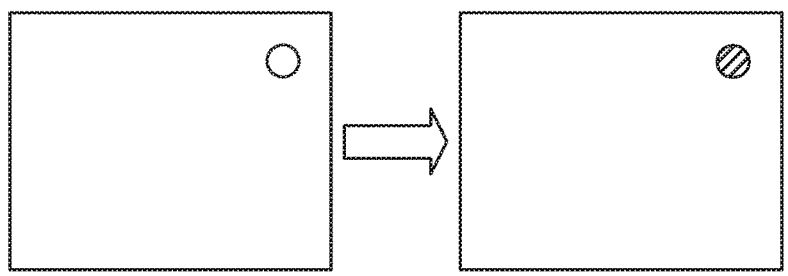
DETECT CHANGE BY SMALL DISPARITY
Fig.5
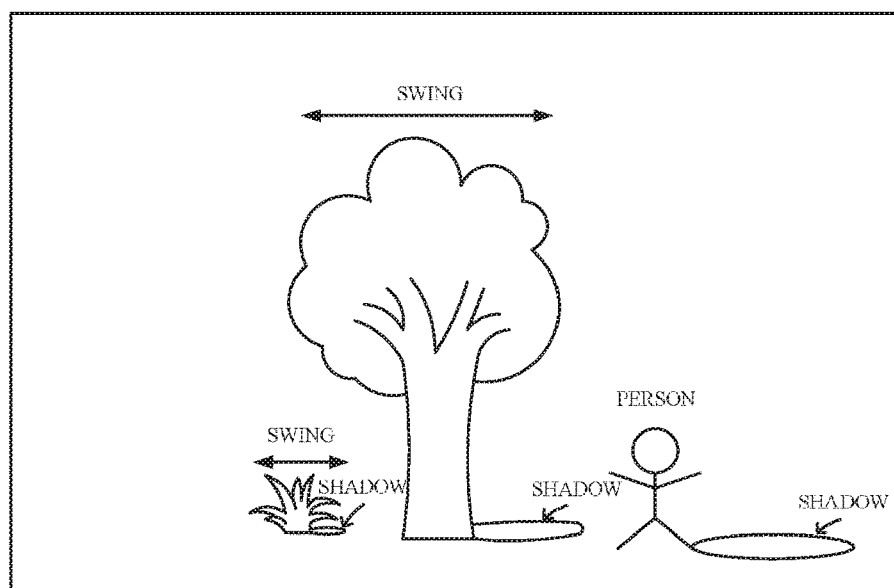

Fig.6
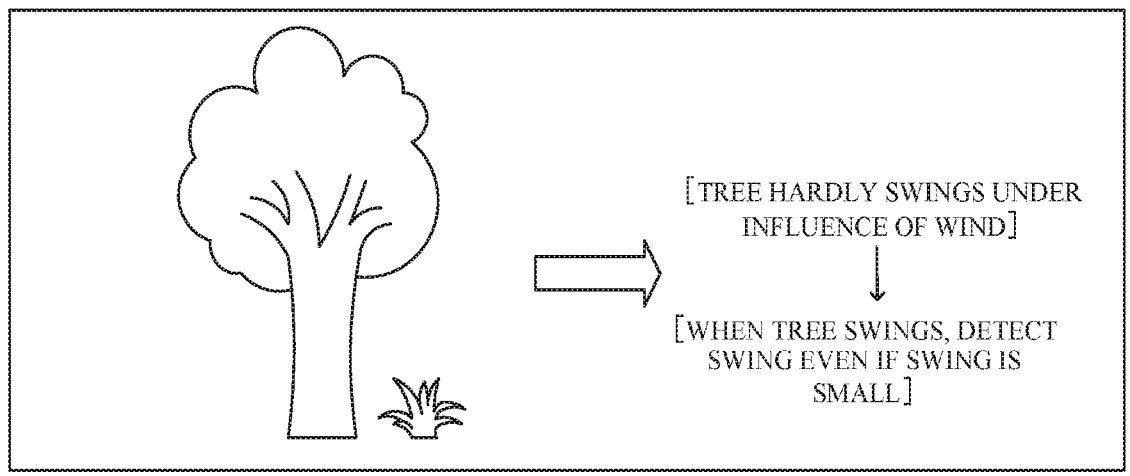
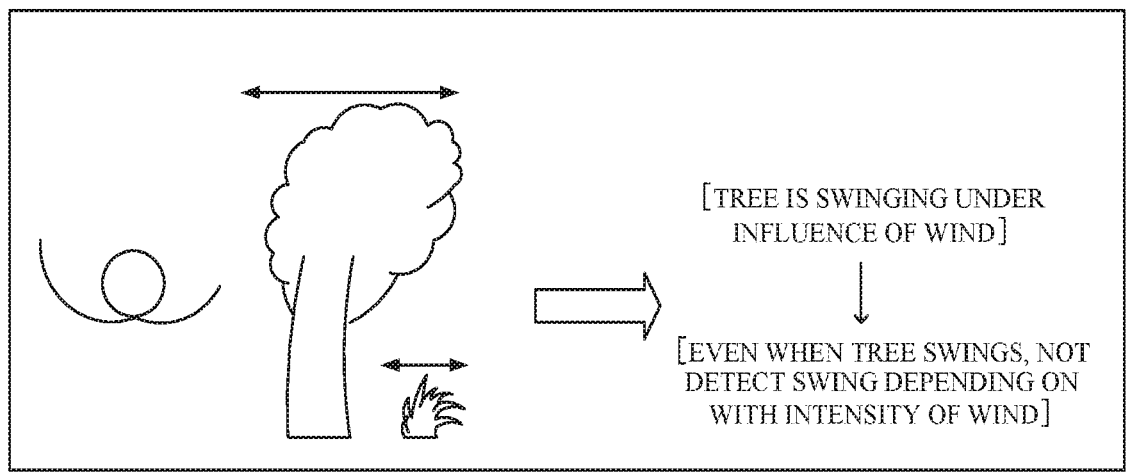

Fig. 7
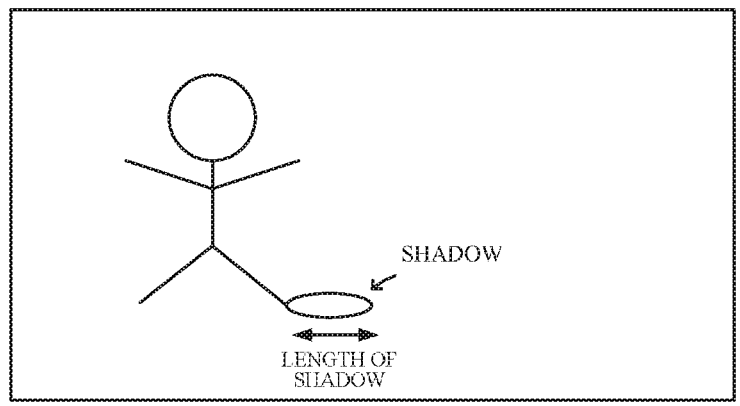
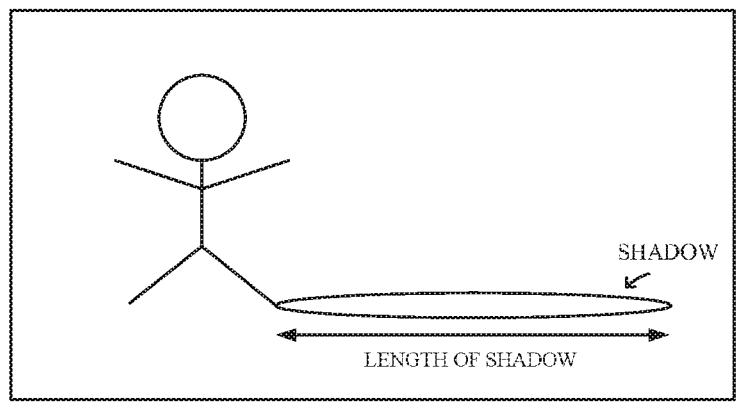
Fig. 8
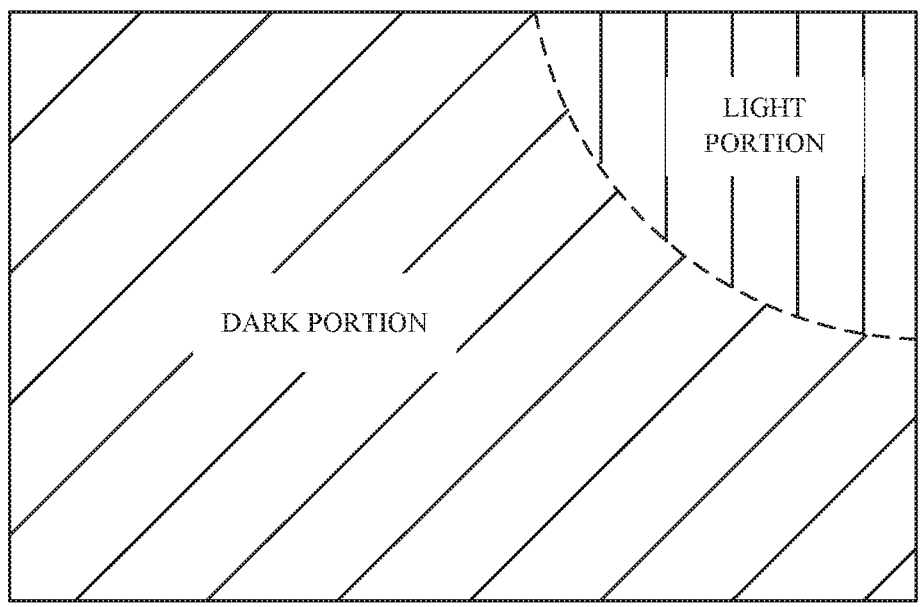

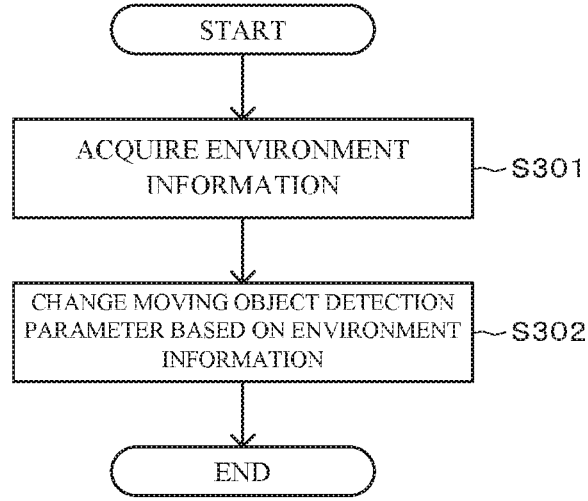
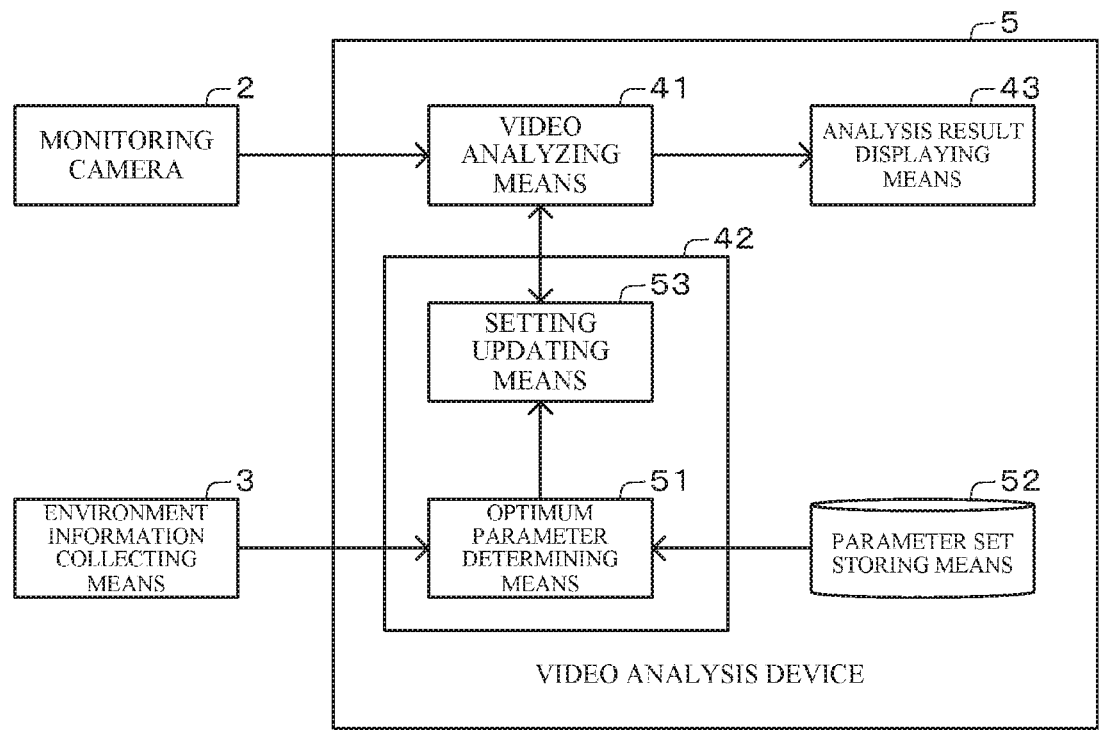

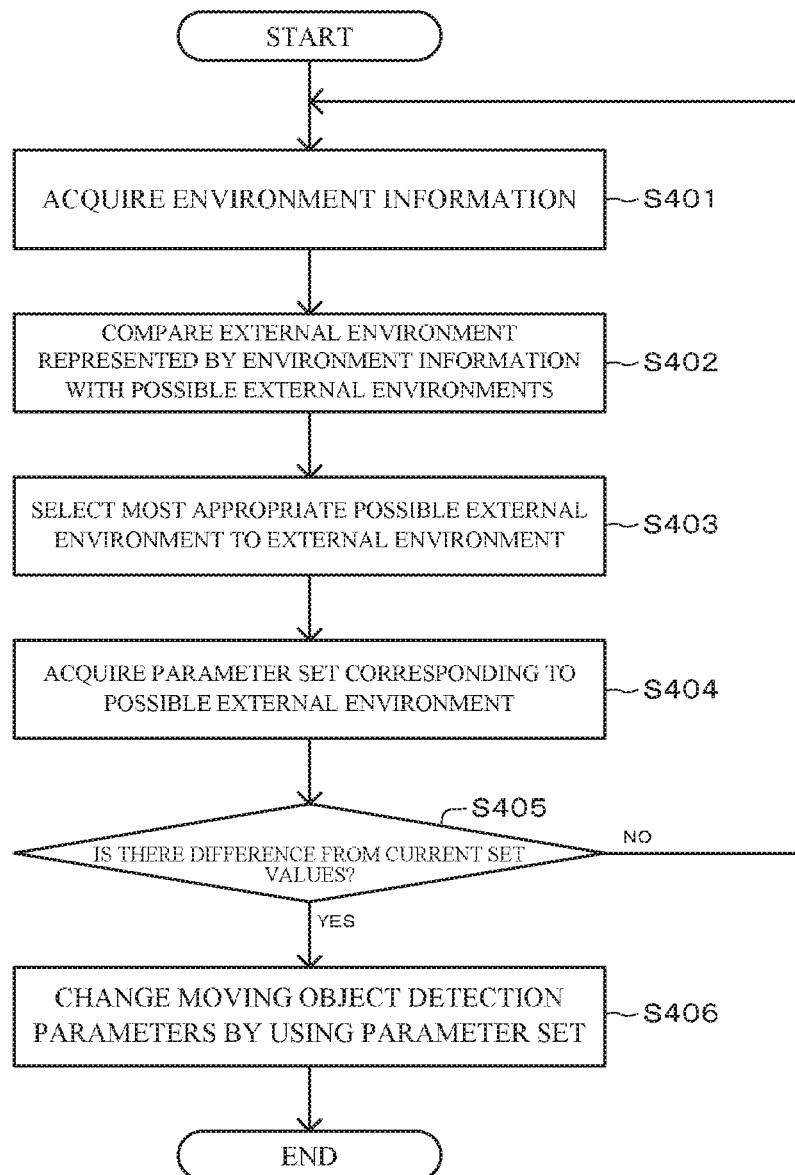

SHADOW REMOVAL VIDEO ANALYSIS SYSTEM

The present application is a Continuation application of Ser. No. 15/117,814 filed on Aug. 10, 2016, which is a National Stage Entry of PCT/JP2015/000529 filed on Feb. 5, 2015, which claims priority from Japanese Patent Application 2014-026465 filed on Feb. 14, 2014, the contents of all of which are incorporated herein by reference, in their entirety.

TECHNICAL FIELD

The present invention relates to a video analysis system, a video analysis device, a video analysis method, and a program

BACKGROUND ART

There is a known video analysis system which includes a monitoring camera to be installed and monitors a moving object such as a person moving in a monitored area for the purpose of crime prevention, disaster prevention, and so on. For example, it is proposed as a first related technique relating to the present invention to compare a frame image of a video image shot by a monitoring camera with a last frame image, extract a difference between the frame images, and detect a moving object such as an intruder based on the extracted difference (see Patent Document 1, for example).

On the other hand, the following techniques are proposed as other techniques relating to the present invention.

First, it is proposed as a second related technique relating to the present invention to acquire camera information and related information which are acquired or inputted in shooting an image, estimate the scene of the image by using the camera information and the related information, and execute predetermined image processing appropriate to the estimated image scene (see Patent Document 2, for example). According to this second related technique, it is possible to correct data of a shot image in accordance with a shooting environment and increase the quality of the image.

Further, the following image correction system is proposed as a third related technique relating to the present invention. The image correction system includes an information acquisition part which acquires state information showing a state in which a photograph has been shot, a correction parameter selection part which selects a plurality of correction parameters based on the state information, and an image quality correction part which executes an image data correction process by using the selected correction parameters. According to the third related technique, it is possible to alter the quality of a shot image in accordance with a shooting environment.

Patent Document 1: Japanese Unexamined Patent Application Publication No. JP-A 2011-077617
Patent Document 2: Japanese Unexamined Patent Application Publication No. JP-A 2011-238177
Patent Document 3: Japanese Unexamined Patent Application Publication No. JP-A 2010-171661

When a video analysis system as mentioned above is used, a monitoring camera which acquires video data may be installed outdoors, for example, on the street or around the entrance. When the monitoring camera is thus installed outdoors, the environment of a place where the monitoring camera is installed change under the influence of change of the outdoor environment. In other words, when the monitoring camera is installed outdoors, the environment of the installation place greatly varies depending on, for example, whether it is fine or rainy, whether it is in the daytime or at night, and whether the wind is blowing or not. When the environment of the place where the monitoring camera is installed changes, video data acquired by the monitoring camera changes. For example, the shadow of a moving object is clearly shown on a fine day, but the shadow is not shown on a cloudy day. On a windy day, trees or the like on the background largely swings.

Therefore, it is desired to prevent the accuracy of detection of a moving object from being affected even when the environment of a place where a monitoring camera is installed changes and video data changes.

In order to deal with such a problem, it is possible to consider applying the second or third related technique to the first related technique and correcting data of a shot image in accordance with the shooting environment to increase or change the quality of the image. However, increase or alteration of the quality of an image does not necessarily lead to increase of the analysis performance of a video analysis system. For example, when the quality of image data including a person as a subject is increased by using the abovementioned techniques, a portion corresponding to the shadow of the person is also shown sharply. As a result, a video analysis system may falsely detect the sharply shown portion corresponding to the shadow of the person as a moving object. Thus, for a video analysis system, simple increase or alteration of the quality of an image does not always lead to increase of the analysis performance.

Thus, a video analysis system has a problem that change of the environment of installation of a monitoring camera and change of video data may affect the accuracy of detection of a moving object.

SUMMARY

Accordingly, an object of the present invention is to provide a video analysis system which solves the problem that change of the environment of installation of a monitoring camera and change of video data may affect the accuracy of detection of a moving object.

In order to achieve the object, a video analysis system as an aspect of the present invention includes:

a video data acquiring means for acquiring video data;

a moving object detecting means for detecting a moving object from video data by using a moving object detection parameter, the moving object moving in the video data, the video data having been acquired by the video data acquiring means, the moving object detection parameter being a parameter for detecting a moving object;

an environment information collecting means for collecting environment information representing an external environment of a place where the video data acquiring means is installed; and a parameter changing means for changing the moving object detection parameter on a basis of the environment information collected by the environment information collecting means, the moving object detection parameter being used when the moving object detecting means detects the moving object.

Further, a video analysis device as another aspect of the present invention includes:

a video data acquisition part configured to acquire video data from an external device, the video data having been acquired by the external device;

a moving object detection part configured to detect a moving object from video data by using a moving object detection parameter, the moving object moving in the video data, the video data having been acquired by the video data acquisition part, the moving object detection parameter being a parameter for detecting a moving object;

an environment information collection part configured to collect environment information representing an external environment of a place where the external device having acquired the video data is installed; and a parameter changing part configured to change the moving object detection parameter on a basis of the environment information collected by the environment information collection part, the moving object detection parameter being used when the moving object detection part detects the moving object.

Further, a video analysis method as another aspect of the present invention includes:

collecting environment information and changing a moving object detection parameter on a basis of the collected environment information, the environment information representing an external environment of a place where an external device acquiring video data is installed, the moving object detection parameter being used when detecting a moving object from the video data; and detecting the moving object from the video data by using the changed moving object detection parameter, the moving object moving in the video data, the video data being acquired from the external device.

Further, a computer program including instructions for causing a video analysis device to function as:

a video data acquisition part configured to acquire video data from an external device, the video data being acquired by the external device;

a moving object detection part configured to detect a moving object from video data by using a moving object detection parameter, the moving object moving in the video data, the video data being acquired by the video data acquisition part, the moving object detection parameter being a parameter for detecting a moving object;

an environment information collection part configured to collect environment information representing an external environment of a place where the external device having acquired the video data is installed; and a parameter changing part configured to change the moving object detection parameter on a basis of the environment information acquired by the environment information collection part, the moving object detection parameter being used when the moving object detection part detects the moving object.

With the configurations as described above, the present invention enables provision of a video analysis system in which change of the environment of installation of a monitoring camera or change of video data do not affect the accuracy of detection of a moving object.

BRIEF DESCRIPTION OF DRAWINGS

FIG. 4 is a view for describing an example of a moving object detection parameter changed by a parameter changing means of a video analysis device shown in FIG. 2;

FIG. 5 is a view for describing an example of the moving object detection parameter changed by the parameter changing means of the video analysis device shown in FIG. 2;

FIG. 6 is a view for describing an example of the moving object detection parameter changed by the parameter changing means of the video analysis device shown in FIG. 2;

FIG. 7 is a view for describing an example of the moving object detection parameter changed by the parameter changing means of the video analysis device shown in FIG. 2;

FIG. 8 is a view for describing an example of the moving object detection parameter changed by the parameter changing means of the video analysis device shown in FIG. 2;

FIG. 11 is a flowchart showing an example of a process for changing a moving object detection parameter based on environment information by the video analysis system according to the first exemplary embodiment of the present invention;

FIG. 12 is a block diagram showing the configuration of a video analysis system according to a second exemplary embodiment of the present invention;

FIG. 13 is a flowchart showing an example of a process for changing a moving object detection parameter based on environment information by the video analysis system according to the second exemplary embodiment of the present invention;

EXEMPLARY EMBODIMENTS

Next, the exemplary embodiments of the present invention will be described in detail referring to the attached drawings.

First Exemplary Embodiment

Figure 1:
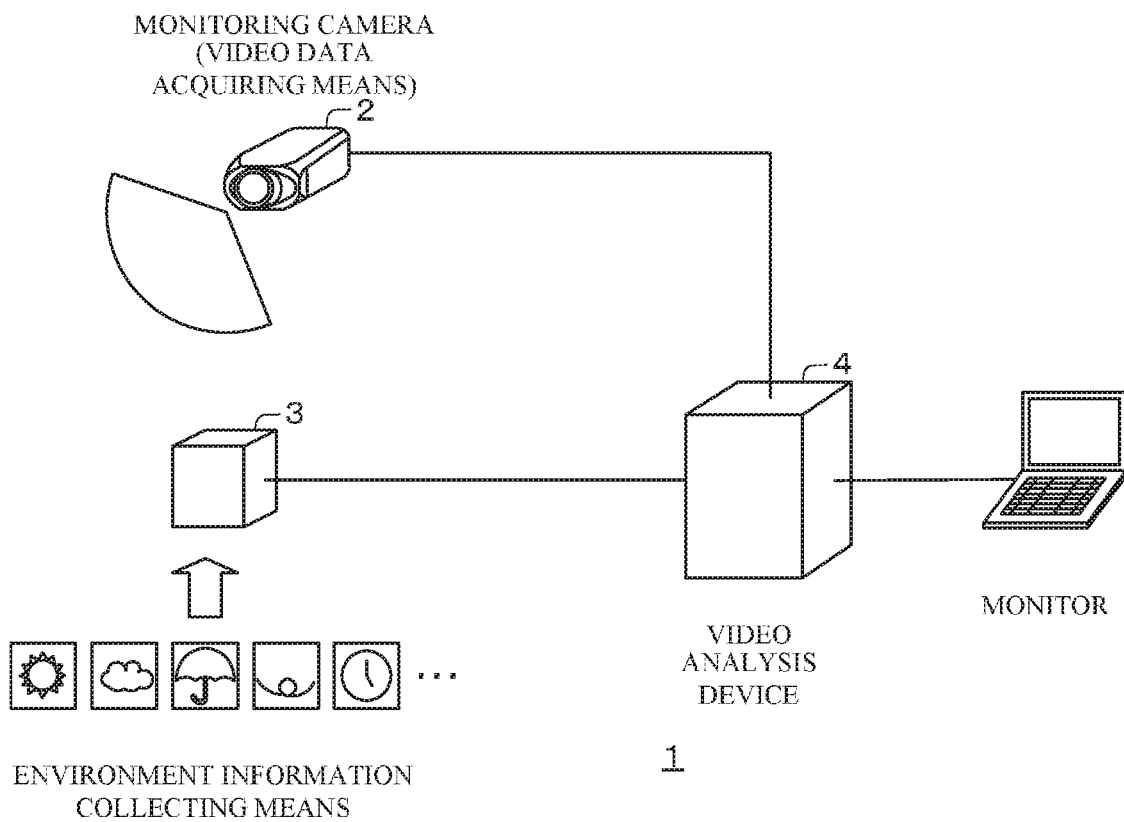
FIG. 1 is a view showing the configuration overview of a whole video analysis system according to a first exemplary embodiment of the present invention.

Referring to FIG. 1, in a video analysis system 1 according to a first exemplary embodiment of the present invention, a monitoring camera 2 (a video data acquiring means) acquires video data. Next, a video analysis device 4 detects a moving object moving in the video data by using a moving object detection parameter. Also, the video analysis device 4 acquires the trajectory of the moving object, and so on. Then, the result of the detection by the video analysis device 4 is outputted to an output device such as a monitor. Thus, the video analysis system 1 according to this exemplary embodiment is a system which analyzes video data, recognizes moving objects in the video data, and monitors the flow (the traveling method, flow line, behavior, and so on) of the moving objects. In this exemplary embodiment, as described later, a moving object detection parameter used when the video analysis device 4 detects a moving object in video data is properly changed based on environment information collected by an environment information collecting means 3. Hereinafter, this exemplary embodiment will describe a video analysis system 1 which detects a moving person in video data of video analysis systems 1 which detect moving objects.

Figure 2:
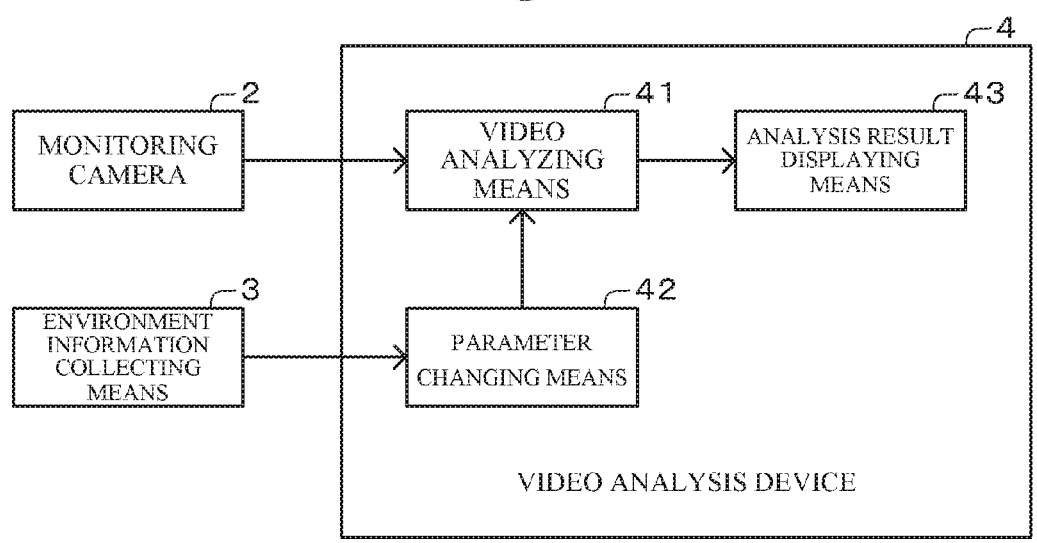
FIG. 2 is a block diagram showing the configuration of the video analysis system according to the first exemplary embodiment of the present invention.

Referring to FIG. 2, the video analysis system 1 according to the first exemplary embodiment of the present invention has the monitoring camera 2 (the video data acquiring means), the environment information collecting means 3, and the video analysis device 4. Further, the video analysis device 4 has a video analyzing means 41 (a moving object detecting means), a parameter changing means 42, and an analysis result displaying means 43. The video analysis device 4 in this exemplary embodiment is an information processing device which includes an arithmetic device and a storage device. The video analysis device 4 realizes the respective functions described above by execution of a program stored in the storage device by the arithmetic device.

The monitoring camera 2 is installed at a predetermined position and has a function of acquiring video data at the predetermined position where the monitoring camera 2 is installed. The monitoring camera 2 is installed, for example, at the airport, at an oil plant, and on the street, and is connected to the video analysis device 4 via an external network or the like. The monitoring camera 2 processes video data acquired by the monitoring camera 2 into a predetermined format, and thereafter, transmits the video data to the video analyzing means 41 included by the video analysis device 4 via the external network or the like.

This exemplary embodiment will describe a case where the video analysis system 1 includes one monitoring camera 2. However, the video analysis system 1 according to this exemplary embodiment is not limited to the case where the video analysis system 1 includes the one monitoring camera 2. The video analysis system 1 may be configured to acquire video data from a plurality of monitoring cameras 2. Further, the video data acquiring means included by the video analysis system 1 is not limited to a case of using the monitoring camera 2. The video analysis system 1 may include any video data acquiring means which acquires video data, instead of the monitoring camera 2.

The environment information collecting means 3 has a function of collecting environment information representing the external environment of a place where the monitoring camera 2 is installed. For example, the date, time (daytime, night), weather information, and latitude and longitude of a place where the monitoring camera 2 is installed are regarded as the external environment. The environment information is information for grasping the external environment of a place where the monitoring camera 2 is installed (i.e., a shooting environment condition).

Figure 3:
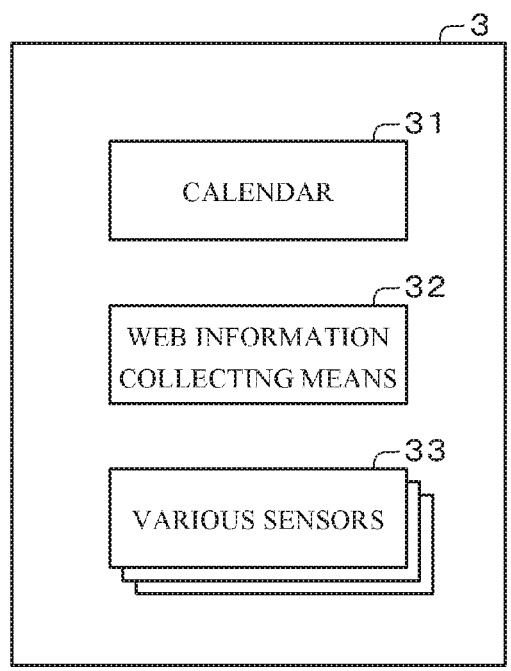
FIG. 3 is a block diagram showing an example of the configuration of an environment information collecting means included by the video analysis system according to the first exemplary embodiment of the present invention.

Referring to FIG. 3, the environment information collecting means 3 has, for example, a calendar 31, a Web information collecting means 32, and various sensors 33 such as a GPS sensor, a heliograph, a rain gauge and an anemometer. The video analysis system 1 grasps the state of the shooting environment (the external environment) in the vicinity of the monitoring camera 2 by using the environment information collecting means 3. Among the various sensors 33, various physical sensors such as the GPS sensor, the heliograph, the rain gauge and the anemometer need to be installed in the vicinity of the monitoring camera 2 acquiring video data. On the other hand, the calendar 31, the Web information collecting means 32, and so on, that are not the physical sensors do not always need to be installed in the vicinity of the monitoring camera 2. In other words, (part of) the function as the environment information collecting means 3 may be included by the video analysis device 4 to be described later.

The calendar 31 is used to collect information such as the sunrise, the sunset, the moon's age, and the culmination altitude. The Web information collecting means 32 is used to collect information such as weather forecast information and the presence or absence of any event on the Internet. The various sensors 33 are used to grasp, for example, the time, sunshine duration, rainfall, and wind speed of a place where the monitoring camera 3 is installed. To be specific, the environment information collecting means 3 collects information such as the latitude and longitude, the height and the time by using the GPS sensor, for example. The environment information collecting means 3 collects a sunshine duration by using a heliograph, a rainfall by using a rain gauge, and a wind speed by using an anemometer, for example.

Thus, the environment information collecting means 3 collects various information (environment information) for grasping the external environment of the monitoring camera 2 by using the calendar 31, the Web information collecting means 32 and the various sensors 33, for example. Then, the environment information collecting means 3 transmits the various environment information collected thereby to the parameter changing means 42 of the video analysis device 4.

The environment information collecting means 3 may be configured to acquire environment information by using a method other than the abovementioned one. For example, the environment information collecting means 3 can include a meteorological instrument other than the abovementioned ones. Alternatively, the environment information collecting means 3 do not need to include the calendar 31, the Web information collecting means 32 and the various sensors 33 all. The environment information collecting means 3 only needs to be configured to be capable of collecting information (environment information) necessary to grasp the external environment of a place where the monitoring camera 2 is installed.

The video analysis device 4 has a function of detecting a person moving in video data acquired by the monitoring camera 2 by using a moving object detection parameter. The video analysis device 4 also has a function of changing a moving object detection parameter based on environment information collected by the environment information collecting means 3.

As described above, the video analysis device 4 is an information processing device which includes a storage device and an arithmetic device. The video analysis device 4 realizes the video analyzing means 41, the parameter changing means 42 and the analysis result displaying means 43 by execution of a program stored in the storage device by the arithmetic device.

The video analyzing means 41 has a function of detecting a person moving in video data acquired by the monitoring camera 2 by using a moving object detection parameter. The video analyzing means 41 also has a function of acquiring the trajectory of the detected moving person, and so on. The video analyzing means 41 is connected with the monitoring camera 2 via an external network or the like and acquires video data acquired by the monitoring camera 2 from the monitoring camera 2. Then, the video analyzing means 41 detects a person moving in the acquired video data by using a moving object detection parameter.

To be specific, the video analyzing means 41 in this exemplary embodiment obtains a difference of image data extracted from video data, and thereby finds an unstill object. In other words, the video analyzing means 41 obtains a difference between image data of a previous frame (an integration result) and image data of a current frame, and thereby finds an unstill object. Then, the video analyzing means 41 removes a predetermined object of the unstill objects as a moving object other than a detection target object (a person) from a detection target. For example, the video analyzing means 41 removes a moving object other than a person from a detection target by using a reciprocating object removal filter, a shadow removal filter or the like to be described later. Moreover, the video analyzing means 41 is capable of grasping what the unstill object is (for example, whether the unstill object is a person or not) by using a technique such as pattern recognition. Thus, the video analyzing means 41 detects a person moving in the video data. Then, the video analyzing means 41 tracks the grasped person by using a particle filter or the like, and acquires the trajectory of movement of the detected person. Further, the video analyzing means 41 transmits the detected person and the trajectory of the movement of the detected person as the detection result to the analysis result displaying means 43.

The abovementioned moving object detection parameter is used, for example, when the video analyzing means 41 obtains a difference of image data to find an unstill object, and when the video analyzing means 41 uses a filter for removing a moving object other than a person. The details of the moving object detection parameter will be described later.

The parameter changing means 42 has a function of changing a moving object detection parameter used when the video analyzing means 41 detects a moving object in video data, by using environment information acquired from the environment information collecting means 3. The parameter changing means 42 is connected with the environment information collecting means 3, and acquires environment information collected by the environment information collecting means 3. The parameter changing means 42 changes a moving object detection parameter based on (the external environment represented by) the acquired environment information (for example, so as to make the moving object detection parameter optimum for the external environment).

Change of a moving object detection parameter by the parameter changing means 42 is carried out by using a parameter set, which is a set of moving object detection parameters previously determined in accordance with a possible external environment, for example. The parameter changing means 42 may be configured to change each moving object detection parameter so that the moving object detection parameter becomes the most appropriate to the external environment represented by the acquired environment information.

Thus, the parameter changing means 42 acquires environment information from the environment information collecting means 3. Then, the parameter changing means 42 changes a moving object detection parameter used when the video analyzing means 41 detects a moving object in video data, based on the acquired environment information.

The analysis result displaying means 43 is connected to the output device such as the monitor. The analysis result displaying means 43 acquires an analysis result of analysis by the video analyzing means 41 (a person, the trajectory of movement of the person, and so on, as the result of the detection) from the video analyzing means 41. The analysis result displaying means 43 then causes the output device such as the monitor to display the analysis result.

That is the configuration of the video analysis system 1. Meanwhile, the video analysis system 1 (for example, the video analysis device 4 thereof) may include an analysis result accumulating means for storing the results of analysis by the video analyzing means 41, and a video data accumulating means for storing video data. Moreover, the video analysis system 1 can include an operation checking means for checking a system operation using a moving object detection parameter changed by the abovementioned configuration, and a parameter regulating means for autonomously conducting fine regulation of a moving object detection parameter in response to the check of the operation by the operation checking means.

Next, the details of the abovementioned moving object detection parameter will be described with some specific examples.

A moving object detection parameter is a parameter used when the video analyzing means 41 detects a moving object in video data. As described above, a moving object detection parameter is used, for example, when the video analyzing means 41 obtains a difference of image data to find an unstill object, and when the video analyzing means 41 uses a filter for removing a moving object other than a person. A moving object detection parameter is a sensitivity threshold, a moving object distinction threshold such as a reciprocating object removal threshold and a shadow removal threshold, and so on.

A sensitivity threshold is one of the moving object detection parameters and is a threshold which is the criterion for recognizing a difference between image data of a previous frame and image data of a current frame. In other words, a sensitivity threshold is a threshold used for recognizing a moving object (an unstill object).

Describing specifically, when detecting a difference between image data of a previous frame and image data of a current frame, the video analyzing means 41 detects a disparity between image data of a previous frame and image data of a current frame every minimum unit, for example, every pixel. A sensitivity threshold is a threshold for determining the degree of change of the minimum unit for recognizing that (a certain minimum unit of) image data of a current frame has changed from (a certain minimum unit of) image data of a previous frame. In other words, a sensitivity threshold is the criterion for determining how to deal with a disparity between image data of a previous frame and image data of a current frame when detecting the disparity (i.e., determining whether or not image data has changed).

The video analysis system 1 according to this exemplary embodiment changes the sensitivity threshold described above based on environment information collected by the environment information collecting means. Referring to FIG. 4, a sensitivity threshold used when the video analyzing means 41 detects a moving object in video data can be differentiated, for example, between a light place (in the daytime, on a fine day, and so on) and a dark place (at night, on a cloudy day, and so on). In other words, a sensitivity threshold can be changed in accordance with environment information such as the time, luminance and weather collected by the environment information collecting means 3. It is assumed that the monitoring camera 2 acquires video data in a light place and, therefore, a sensitivity threshold is set so that change of the minimum unit is recognized at a point when a while color turns to a gray color (i.e., so that a change is detected with a wide disparity range to some degree). Moreover, it is assumed that, in the above condition, time passes by and it gets dark at night in a place where the monitoring camera 2 is installed. In this case, if the sensitivity threshold for the light place is still used, it may be impossible when, for example, a person wearing navy clothes is moving to detect the person well because the person is under the cover of darkness. In other words, because contrast is generally small when it is dark such as at night, there is a case where a change cannot be accurately detected if a sensitivity threshold for a daytime is used. Therefore, when the environment information collecting means 3 collects environment information such as a night time, the parameter changing means 42 of the video analysis system 1 changes a sensitivity threshold based on the collected environment information. For example, when the environment information collecting means 3 collects environment information of a night time, the parameter changing means 42 changes a sensitivity threshold so that a change of the minimum unit is recognized at a point when a white color turns to a light gray color (i.e., so that a change is detected by a little disparity). Consequently, it becomes possible to accurately detect a small change and, for example, it becomes possible to detect a person wearing navy clothes without any problem even when the person is moving at night.

A moving object distinction threshold is one of the moving object detection parameters as well as a sensitivity threshold. A moving object distinction threshold is a threshold which is the criterion used when a filter for removing a moving object other than a detection target object (a person) from a detection target distinguishes a person (a detection target object) from a moving object other than the person (other than the detection target object). Referring to FIG. 5, it is found that the video analyzing means 41 possibly detects, other than a person as the target of detection, a swinging tree and grass, shadow or the like as moving objects. It is anticipated that detecting all the moving objects and checking what all the detected moving objects are needs execution of a large number of processes and the processing gets heavy. Therefore, the video analyzing means 41 executes processing so as to detect a moving object other than a person as a moving object as little as possible, by using a predetermined filter for removing a moving object other than a person of a detection target object. For example, a reciprocating object removal filter, a shadow removal filter and the like are regarded as the predetermined filter. Moreover, for example, a reciprocating object removal threshold, a shadow removal threshold and the like are regarded as a moving object distinction threshold.

A reciprocating object removal filter is a filter which regards a reciprocating object conducting a predetermined reciprocation of a repeating movement as a moving object other than a person to become a detection target and excludes the reciprocating object from the detection target. Moreover, a reciprocating object removal threshold is a threshold which is the criterion used when the reciprocating object removal filter distinguishes a person from a reciprocating object. For example, a tree, grass and electric line swung by wind are thought as reciprocating objects. Movement of the reciprocating object is different from movement of a person having irregular vectors. Therefore, it is possible to exclude such a reciprocating object, namely, a moving object other than a person to be a detection target from the detection target. A reciprocating object removal threshold is, for example, a threshold appropriate to the swing width and frequency of reciprocation.

Referring to FIG. 6, a reciprocating object removal threshold used when a reciprocating object removal filter distinguishes a person from a reciprocating object can be varied, for example, in accordance with environment information such as the presence/absence of the wind and the intensity of the wind collected by the environment information collecting means 3. To be specific, for example, in an environment where the wind is not blowing, a tree or grass does not swing under the influence of the wind. Therefore, for example, in a case where the environment information collecting means 3 collects environment information of no wind, the parameter changing means 42 is expected not to set a reciprocating object removal threshold and not to use a reciprocating object removal filter. On the other hand, in an environment where the wind is blowing, a tree and grass swing under the influence of the wind. Therefore, the parameter changing means 42 changes a reciprocating object removal threshold in accordance with the wind speed collected by the environment information collecting means 3, for example. To be specific, for example, in a case where the environment information collecting means 3 collects environment information of the wind speed and it is determined the wind is strong based on the collected environment information of the wind speed, the parameter changing means 42 is expected to change a reciprocating object removal threshold to be higher. On the other hand, in a case where it is determined that it is calm based on the environment information of the wind speed collected by the environment information collecting means 3, the parameter changing means 42 is expected to set a reciprocating object removal filter to be lower, or expected not to set a reciprocating object removal threshold and not to apply a reciprocating object removal filter. Meanwhile, the parameter changing means 42 may be configured to set a reciprocating object removal threshold to be higher in stages in accordance with the intensity of the wind (the wind speed). Thus, change of a reciprocating object removal threshold by the parameter changing means 42 in accordance with the environment information (the wind speed) collected by the environment information collecting means 3 makes it possible to accurately remove a reciprocating object from the detection target. A preset threshold (a strong wind determination threshold, a calm determination threshold or the like) may be used for determining whether the environment information of the wind speed collected by the environment information collecting means 3 represents a strong wind or no wind. For example, in a case where the wind speed represented by the environment information is more than the strong wind determination threshold, it is determined windy. In a case where the wind speed represented by the environment information is equal to or less than the calm determination threshold, it is determined calm. Such a configuration makes it possible to determine the intensity of the wind (whether it is windy or calm, for example) based on the environment information of the wind speed. Further, including a plurality of thresholds enables determination of the intensity of the wind in stages based on the environment information of the wind speed.

A shadow removal filter is a filter which regards a predetermined shadow as a moving object other than a person to be a detection target and excludes the predetermined shadow from the detection target. Further, a shadow removal threshold is a threshold which is the criterion used when the shadow removal filter distinguishes the person from the predetermined shadow. When the person of the detection target moves, a shadow thereof also moves together with the person. As a result, the shadow may interfere with detection of the person. Therefore, the shadow is regarded as a moving object which is not the person of the detection target, and is excluded from the detection target. A shadow removal threshold is, for example, a threshold which represents the amount (length, density or the like) of the shadow to be removed.

Referring to FIG. 7, a shadow removal threshold used when a shadow removal filter distinguishes a person from a shadow can be changed, for example, in accordance with environment information such as time collected by the environment information collecting means 3. To be specific, for example, the length of a shadow made around noon is different from the length of a shadow made around dusk. Therefore, the amount such as length of a shadow to be removed is changed in accordance with environment information such as time and latitude collected by the environment information collecting means 3. To be specific, for example, when time (environment information) collected by the environment information collecting means 3 represents noon, the parameter changing means 42 is expected to set a shadow removal threshold to be low. On the other hand, for example, when time (environment information) collected by the environment information collecting means 3 represents sunrise time or sunset time, the parameter changing means 42 is expected to set a shadow removal threshold to be high. The environment information collecting means 3 may collect the latitude, the longitude, the date or the like, other than time, as environment information. Thus, change of a shadow removal threshold by the parameter changing means 42 in accordance with environment information collected by the environment information collecting means 3 makes it possible to accurately remove a shadow. The abovementioned determination using environment information of time is also enabled by using a preset threshold. For example, in a case where environment information of time represents within a range of preset time (a threshold representing a range of time), the parameter changing means is expected to determine that it is sunrise or sunset. Moreover, a threshold for such a determination may be changed based on environment information of the latitude and longitude, environment information representing season, and so on. Moreover, a shadow may be different in intensity (density) depending on the weather, for example. Therefore, the parameter changing means 42 may be configured to be capable of changing the amount of a shadow to be removed depending on the weather.

Thus, the video analyzing means 41 is capable of using various filters for removing a moving object other than a detection target object (a person) from a detection target, and capable of using various moving object distinction thresholds. Meanwhile, the video analyzing means 41 can use various filters other than the ones described above. For example, the video analyzing means 41 may use a color tone correction filter, a sunshine variation filter which is a filter for detecting variation of the whole environment, and so on. The video analyzing means 41 may be configured to also change a moving object distinction threshold of the criterion used when the color tone correction filter or the sunshine variation filter distinguishes a person from a moving object other than the person, based on environment information collected by the environment information collecting means 3. Moreover, the video analyzing mean 41 may include a filter for excluding a given value of a white color parameter depending on the intensity of fog, for example.

Further, the video analyzing means 41 can be configured to detect a moving object by using a parameter other than the moving object detection parameter described above. For example, the video analyzing means 41 may be configured to regulate a contrast value according to a difference in weather.

Further, for example, referring to FIG. 8, there is a case where video data acquired by the monitoring camera 2 includes target regions corresponding to multiple kinds of environment information such as a light portion and a dark portion. In this case, for example, the video analyzing means 41 can be configured to separate a sensitivity threshold for the light portion and a sensitivity threshold for the dark portion. In other words, with respect to one video data, the video analyzing means 41 may use one moving object detection parameter for each kind, or may use a plurality of moving object detection parameters for one kind. By determining the external environment of a place where the monitoring camera 2 is installed by separating into a plurality of regions, it becomes possible to perform change of a moving object detection parameter more appropriate to the external environment.

Next, the operation of the video analysis system 1 according to this exemplary embodiment will be described.

Firstly, an operation when the monitoring camera 2 acquires video data, the video analysis device 4 detects a person of a detection target from the acquired video data and the output device outputs the result of the detection will be described.

Figure 9:
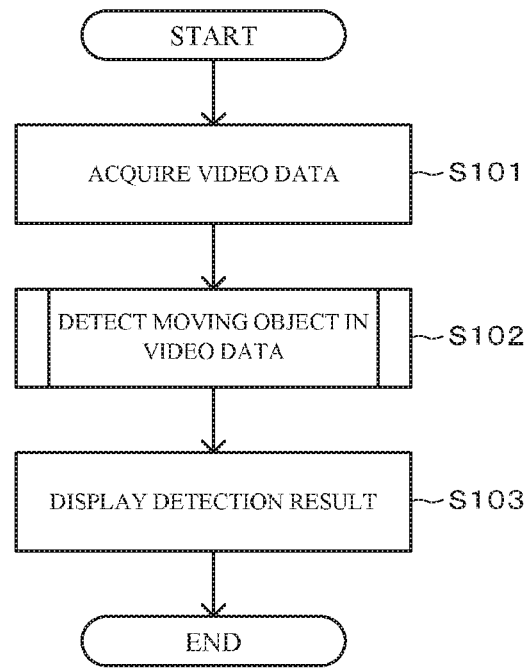
FIG. 9 is a flowchart showing an example of a process from acquisition of video data to detection of a person in the video data by the video analysis system according to the first exemplary embodiment of the present invention.

Referring to FIG. 9, the monitoring camera 2 acquires video data at a place where the monitoring camera 2 is installed (S101). Then, the monitoring camera 2 having acquired the video data processes the video data into a predetermined format, and thereafter, transmits the video data to the video analyzing means 41 included by the video analysis device 4 via the external network or the like.

Next, the video analyzing means 41 of the video analysis device 4 receives the video data transmitted by the monitoring camera 2. Then, the video analyzing mean 41 detects a person moving in the acquired video data and the trajectory of the moving person by using a moving object detection parameter (S102). Then, the video analyzing means 41 transmits the detection result (the moving person and the trajectory of the moving person) to the analysis result displaying means 43.

Subsequently, the analysis result displaying means 43 receives the detection result transmitted by the video analyzing means 41. Then, the analysis result displaying means 43 causes the output device such as the monitor connected with the analysis result displaying means 43 to display the analysis result (S103).

That is the operation when the monitoring camera 2 acquires video data, the video analyzing device 4 detects a person of a detection target from the acquired video data, and the output device outputs the detection result. Next, a detailed example of the operation when the video analyzing means 41 detects a moving person and the trajectory of the moving person from video data by using a moving object detection parameter will be described.

Figure 10:
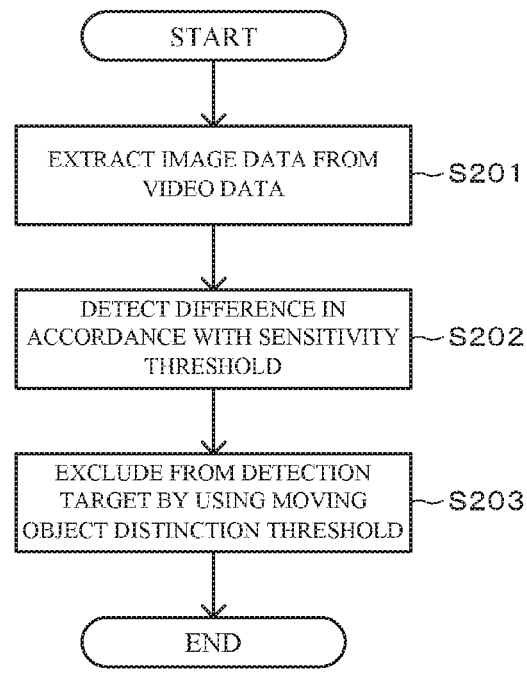
FIG. 10 is a flowchart showing an example of a process for detecting a person in video data by the video analysis system according to the first exemplary embodiment of the present invention.

Referring to FIG. 10, the video analyzing means 41 receives video data transmitted by the monitoring camera 2. The video analyzing means 41 then extracts successive image data from the received video data (S201).

Next, the video analyzing means 41 obtains, for example, a difference between image data of a previous frame and image data of a current frame and determines whether or not the image data of the current frame has changed from the image data of the previous frame in accordance with a sensitivity threshold (S202). Herein, a sensitivity threshold is one of the moving object detection parameters and is the criterion to determine how to deal with a difference between image data of a previous frame and image data of a current frame when the difference is detected (i.e., determine whether there is a change or not). In other words, it varies whether or not the video analyzing means 41 determines that image data of a current frame has changed from image data of a previous frame, in accordance with a sensitivity threshold as one of the moving object detection parameters.

Subsequently, by using a predetermined filter for removing a moving object other than a person of a detection target from the detection target, the video analyzing means 41 executes processing so as to detect a moving object other than a person as a moving object as little as possible (S203). In this processing, the video analyzing means 41 distinguishes a person from a moving object other than a person by using a moving object distinction threshold. Herein, a moving object distinction threshold is one of the moving object detection parameters and, for example, a reciprocating object removal threshold and a shadow removal threshold fall thereunder. The video analyzing means 41 also checks what the detected object is and detects a person. After that, the video analyzing means 41 acquires the trajectory of movement of the person, and so on.

Thus, the video analyzing means 41 detects a person of a detection target from video data by using the sensitivity threshold and the moving object distinction threshold of the moving object detection parameters. Then, the video analyzing means 41 transmits the result of the detection to the analysis result displaying means 43.

That is the operation when the video analyzing means 41 detects a moving person and the trajectory of the moving person from video data by using a moving object detection parameter. Next, an operation when a moving object detection parameter is changed by the parameter changing means 42 will be described.

Referring to FIG. 11, the environment information collecting means 3 collects environment information representing the external environment of a place where the monitoring camera 2 is installed (S301). Then, the environment information collecting means 3 transmits the collected environment information to the parameter changing means 42 of the video analysis device 4. Meanwhile, the environment information collecting means 3 may collect environment information by using a physical sensor such as a GPS sensor, or may collect environment information on the Internet or the like.

Subsequently, the parameter changing means 42 receives the environment information transmitted by the environment information collecting means 3. Then, based on the acquired environment information, the parameter changing means 42 changes a moving object detection parameter used when the video analyzing means 41 detects a person from video data (S302). Change of a moving object detection parameter by the parameter changing means 42 is performed, for example, by using a parameter set which is a set of moving object detection parameters previously determined in accordance with a possible external environment. The parameter changing means 42 may be configured to change a moving object detection parameter for each external environment represented by the environment information.

That is the operation when a moving object detection parameter is changed by the parameter changing means 42.

Thus, the video analysis system 1 according to this exemplary embodiment includes the environment information collecting means 3 and the parameter changing means 42. With such a configuration, the video analysis system 1 is capable of collecting environment information representing the external environment of a place where the monitoring camera 2 is installed, and changing a moving object detection parameter based on the collected environment information. In other words, the video analysis system 1 is capable of changing a moving object detection parameter used by the video analyzing means 41 in accordance with change of the external environment of a place where the monitoring camera 2 is installed. As a result, it is possible to provide the video analysis system 1 that prevents the accuracy of detection of a moving object from being affected even if the environment of a place where the monitoring camera 2 is installed changes and video data changes.

Further, the video analysis system 1 according to this exemplary embodiment includes a sensitivity threshold as one of the moving object detection parameters. Because the video analysis system 1 thus includes the sensitivity threshold, the environment information collecting means 3 and the parameter changing means 42, the video analysis system 1 is capable of changing the sensitivity threshold in accordance with the external environment of a place where the monitoring camera 2 is installed. In other words, the video analysis system 1 is capable of changing the criterion for recognizing a disparity of image data when a difference of image data extracted from video data is obtained, in accordance with the external environment. As a result, it is possible to provide the video analysis system 1 that more reliably prevents the accuracy of detection of a moving object from being affected even if the environment of a place where the monitoring camera 2 is installed changes and video data changes.

Further, the video analysis system 1 according to this exemplary embodiment includes a moving object distinction threshold as one of the moving object detection parameters. Because the video analysis system 1 thus includes the moving object distinction threshold, the environment information collecting means 3 and the parameter changing means 42, the video analysis system 1 is capable of changing a moving object detection threshold in accordance with the external environment of a place where the monitoring camera 2 is installed. In other words, the video analysis system 1 is capable of changing the criterion used when a filter for removing a moving object other than a detection target object from a detection target distinguishes the detection target object from the moving object other than the detection target object, in accordance with the external environment. As a result, it is possible to more reliably provide the video analysis system 1 that prevents the accuracy of detection of a moving object from being affected even if the environment of a place where the monitoring camera 2 is installed changes and video data changes.

In this exemplary embodiment, the video analysis device 4 obtains a difference of image data extracted from video data and thereby detects a person in the video data. However, the present invention is applicable to a case other than the abovementioned case of detecting a person by obtaining a difference. For example, the present invention is also applicable to a case of detecting a person (a detection target object) by a method such as obtaining a motion vector and using pattern recognition.

Further, this exemplary embodiment has described a case where the video analyzing means 41 of the video analysis device 4 detects a person in video data. However, a detection target object, which is a target extracted from video data by the video analyzing means 41, is not limited to a person. The video analyzing means 41 can detect various targets including a car and an animal such as a dog and a cat as detection target objects.

Second Exemplary Embodiment

Next, a second exemplary embodiment of the present invention will be described in detail referring to the drawings. In the second exemplary embodiment, a video analysis system 6 including a parameter set, which is a set of moving object detection parameters previously determined in accordance with a possible external environment, will be described in detail. The video analysis system 6 according to this exemplary embodiment has the partly same configuration as the configuration of the video analysis system 1 described in the first exemplary embodiment. Therefore, in this exemplary embodiment, a description will focus on a different part from the configuration of the first exemplary embodiment.

Referring to FIG. 12, the video analysis system 6 according to the second exemplary embodiment of the present invention has the monitoring camera 2, the environment information collecting means 3, and a video analysis device 5. Further, the video analysis device 5 has the video analyzing means 41, the parameter changing means 42, the analysis result displaying means 43, and a parameter set storing means 52. Further, the parameter changing means 42 has an optimum parameter determining means 51, and a setting updating means 53. In other words, the video analysis system 6 according to this exemplary embodiment is characterized by having the optimum parameter determining means 51, the parameter set storing means 52, and the setting updating means 53. Herein, the same components as those in the first exemplary embodiment will be described, denoted by the same reference numerals as those in the first exemplary embodiment.

Hereinafter, a characteristic part of the second exemplary embodiment will be described. In other words, the configuration of the optimum parameter determining means 51, the parameter set storing means 52 and the setting updating means 53 included by the video analysis device 5 will be described.

The optimum parameter determining means 51 has a function of comparing environment information collected by the environment information collecting means 3 with parameter sets stored by the parameter set storing means 52 described later, and determining and selecting the most appropriate parameter set to the acquired condition (the environment information). The optimum parameter determining means 51 receives environment information transmitted by the environment information collecting means 3. Then, the optimum parameter determining means 51 compares the received environment information with (possible external environments of) parameter sets stored by the parameter set storing means 52, and determines and selects the most appropriate parameter set to the environment information.

Selection of a parameter set by the optimum parameter determining means 51 can be performed by using a table (a matrix) which defines a determination rule, for example. Alternatively, the selection can be performed by storing a combination having ever been experienced by the user as preset values and using the preset values, for example. Thus, the optimum parameter determining means 51 can be configured to select a parameter set by using various means. Then, the optimum parameter determining means 51 transmits the parameter set selected by the abovementioned method to the setting updating means 53.

The parameter set storing means 52 is configured by a storage device such as a hard disk and a RAM (Random Access Memory). The parameter set storing means 52 is used for realization of an optimize function previously included by the video analysis system 6.

The parameter set storing means 52 previously stores sets of moving object detection parameters appropriate to possible external environments, as parameter sets. Moving object detection parameters stored as a parameter set are, for example, control of the sensitivity to lightness, a filter for removing the swing of background objects like trees due to the wind, and control of contrast with respect to a difference in weather. As mentioned above, the parameter sets stored by the parameter set storing means 52 are compared with the external environment by the optimum parameter determining means 51, and a parameter set corresponding to the most appropriate possible external environment to the external environment is selected.

The parameter set storing means 52 can include a parameter set correcting means for correcting the parameter sets (e.g., values of moving object detection parameters thereof) stored by the parameter set storing means 52.

The setting updating means 53 has a function of setting the most appropriate parameter set to the external environment determined by the optimum parameter determining means 51 dynamically in the video analysis system 6. The setting updating means 53 receives a parameter set from the optimum parameter determining means 51. Then, the setting updating means 53 compares current set values (moving object detection parameters being used by the video analyzing means 41) with the latest parameter set (received from the optimum parameter determining means 5). In a case where there is a difference between the current set values and the latest parameter set, the setting updating means 53 changes the moving object detection parameters being used by the video analyzing means 41 with the parameter set. On the other hand, in a case where there is not a difference between the current set values and the latest parameter set, the setting updating means 53 does not change the moving object detection parameters but discards the parameter set, for example.

That is the characteristic configuration of the video analysis system 6 according to this exemplary embodiment. Next, an operation when changing moving object detection parameters, which is a characteristic operation of the video analysis system 6 according to this exemplary embodiment, will be described.

Referring to FIG. 13, the environment information collecting means 3 collects environment information representing the external environment of a place where the monitoring camera 2 is installed (S401). Then, the environment information collecting means 3 transmits the collected environment information to the optimum parameter determining means 51 of the video analysis device 4. The environment information collecting means 3 may collect environment information by using a physical sensor such as a GPS sensor, or may collect environment information on the Internet or the like.

Next, the optimum parameter determining mean 51 receives the environment information transmitted by the environment information collecting means 3. Then, the optimum parameter determining means 51 compares the external environment represented by the received environment information with possible external environments corresponding to the parameter sets stored by the parameter set storing means 52 (S402). Then, the optimum parameter determining means 51 selects the most appropriate possible external environment to the external environment represented by the environment information (S403), and acquires a parameter set corresponding to the selected possible external environment from the parameter set storing means 52 (S404). After that, the optimum parameter determining means 51 transmits the acquired parameter set to the setting updating means 53.

Subsequently, the setting updating means 53 receives the parameter set transmitted by the optimum parameter determining means 51. Then, the setting updating means 53 compares moving object detection parameters (current set values) used when the video analyzing means 41 detects a moving object in video data, with the received parameter set (the latest parameter set) (S405). Then, in a case where there is a difference between the current set values and the latest parameter set (YES at S405), the setting updating means 53 changes the moving object detection parameters used by the video analyzing means 41 with the parameter set (S406). On the other hand, in a case where there is not a difference between the current set values and the latest parameter set (NO at step S405), the setting updating means 53 does not change the moving object detection parameters but discards the parameter set, for example. In this case, the setting updating means 53 waits until environment information is collected by the environment information collecting means 3 again, and determines whether or not to change moving object detection parameters.

That is the operation when the video analysis system 6 changes moving object detection parameters.

Thus, the video analysis system 6 according to this exemplary embodiment includes the optimum parameter determining means 51, the parameter set storing means 52, and the setting updating means 53. With such a configuration, the video analysis system 6 is capable of selecting the most appropriate possible external environment to an external environment represented by environment information collected by the environment information collecting means 3. Moreover, the video analysis system 6 is capable of changing moving object detection parameters with a parameter set appropriate to the selected possible external environment. As a result, it becomes unnecessary to consider change of each moving object detection parameter in accordance with an external environment represented by the environment information collected by the environment information collecting means 3, and it is possible to reduce load of changing moving object detection parameters Next, a third exemplary embodiment of the present invention will be described in detail referring to the attached drawings. The third exemplary embodiment will describe the overview of the configuration of a video analysis system 7.

Third Exemplary Embodiment

Figure 14:
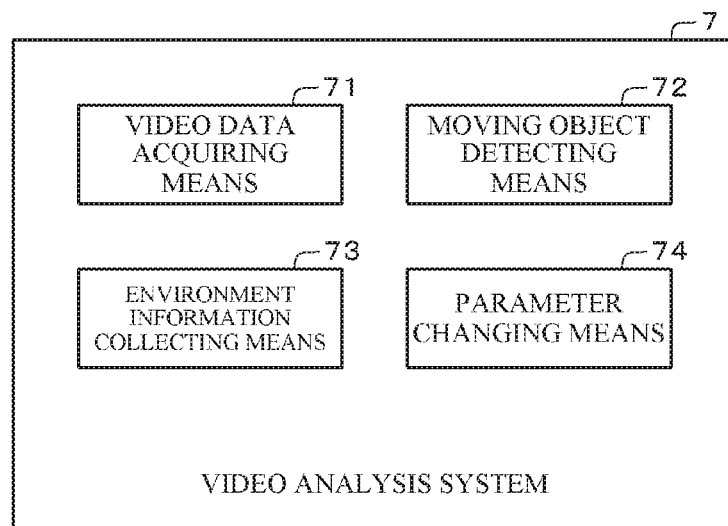
FIG. 14 is a block diagram showing the configuration overview of a video analysis system according to a third exemplary embodiment of the present invention.

Referring to FIG. 14, the video analysis system 7 according to the third exemplary embodiment of the present invention has a video data acquiring means 71, a moving object detecting means 72, an environment information collecting means 73, and a parameter changing means 74.

The video data acquiring means 71 has a function of acquiring video data. The video data acquiring means 71 is a monitoring camera or the like and is installed at the airport, at an oil plant, on the street, and so on. Moreover, the video data acquiring means 71 is connected to the moving object detecting means 72 via a network or the like, and video data acquired by the video data acquiring means 71 is transmitted to the moving object detecting means 72.

The moving object detecting means 72 has a function of detecting, in video data acquired by the video data acquiring means 71, a moving object moving in the video data by using a moving object detection parameter, which is a parameter for detecting a moving object. The moving object detecting means 72 receives video data transmitted by the video data acquiring means 71. Subsequently, the moving object detecting means 72 detects a moving object moving in the video data by using a moving object detection parameter. After that, the moving object detecting means 72 outputs the result of the detection to an external device such as a monitor.

Herein, a moving object detection parameter is a sensitivity threshold, a moving object distinction threshold such as a reciprocating object removal threshold and a shadow removal threshold, or the like. Moreover, a moving object detection parameter is properly changed based on environment information collected by the environment information collecting means 73 as described later.

The environment information collecting means 73 has a function of collecting environment information representing the external environment of a place where the video data acquiring means 71 is installed. The environment information collecting means 73 is, for example, a calendar, a Web information collecting means, and various sensors such as a GPS sensor. The environment information collecting means 73 is connected to the parameter changing means 74, and environment information collected by the environment information collecting means 73 is transmitted to the parameter changing means 74.

The parameter changing means 74 has a function of changing a moving object detection parameter used when the moving object detecting means 72 detects a moving object in video data, based on environment information collected by the environment information collecting means 73. The parameter changing means 74 receives environment information from the environment information collecting means 73. Then, the parameter changing means 74 changes a moving object detection parameter based on (an external environment represented by) the acquired environment information (e.g., so as to optimize the moving object detection parameter for the external environment). Thus, a moving object detection parameter used when the moving object detecting means 72 detects a moving object in video data is changed based on environment information collected by the environment information collecting means 73.

Thus, the video analysis system 7 according to this exemplary embodiment includes the environment information collecting means 73 and the parameter changing means 74. With such a configuration, the video analysis system 7 is capable of collecting environment information representing the external environment of a place where the video image acquiring means 71 is installed, and changing a moving object detection parameter based on the collected environment information. In other words, the video analysis system 7 is capable of changing a moving object detection parameter used by the moving object detecting means 72 in accordance with change of the external environment of a place where the video data acquiring means 71 is installed. As a result, it is possible to provide the video analysis system 7 that prevents the accuracy of detection of a moving object from being affected even if the environment of a place where the video data acquiring means 71 is installed changes and video data changes.

Next, a fourth exemplary embodiment of the present invention will be described in detail referring to the drawings. The fourth exemplary embodiment describes the configuration overview of a video analysis device 8.

Fourth Exemplary Embodiment

Figure 15:
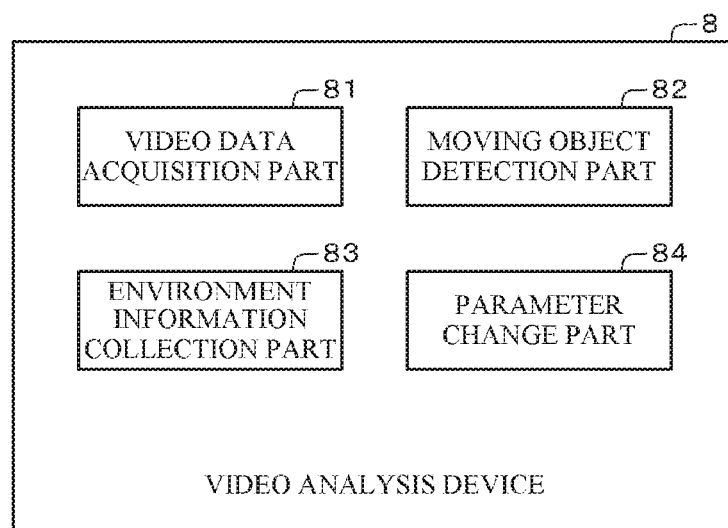
FIG. 15 is a block diagram showing the configuration overview of a video analysis device according to a fourth exemplary embodiment of the present invention.

Referring to FIG. 15, the video analysis device 8 according to the fourth exemplary embodiment of the present invention has a video data acquisition part 81, a moving object detection part 82, an environment information collection part 83, and a parameter changing part 84.

The video data acquisition part 81 has a function of acquiring data of a video image shot by a monitoring camera installed outside or the like. The video data acquisition part 81 is connected to a video data acquiring means such as a monitoring camera installed at the airport, at an oil plant, on the street, and so on, via a network or the like, and acquires video data acquired by the video data acquiring means. The video data acquisition part 81 having acquired the video data transmits the acquired video data to the moving object detection part 82.

The moving object detection part 82 has a function of detecting, in video data acquired by the video data acquisition part 81, a moving object moving in the video data by using a moving object detection parameter, which is a parameter for detecting a moving object. The moving object detection part 82 receives video data transmitted by the video data acquisition part 81. Subsequently, the moving object detection part 82 detects a moving object moving in the video data by using a moving object detection parameter. After that, the moving object detection part 82 outputs the result of the detection to an external device such as a monitor.

Herein, a moving object detection parameter is a sensitivity threshold, a moving object distinction threshold such as a reciprocating object removal threshold and a shadow removal threshold, or the like. Moreover, a moving object detection parameter is properly changed based on environment information collected by the environment information collection part 83 as described later.

The environment information collection part 83 has a function of acquiring environment information representing the external environment of a place where video data acquired by the video data acquisition part 81 has been acquired. The environment information collection part 83 has, for example, a calendar and a Web information collecting means, and collects environment information from the calendar, the Web, and so on. Moreover, the environment information collection part 83 is connected with various sensors such as a GPS sensor which acquires environment information such as meteorological information (time, latitude and longitude, weather, wind speed, and so on) of the place where the video data has been acquired. The environment information collection part 83 collects environment information from the various sensors. Then, the environment information collecting part 83 having collected environment information transmits the collected environment information to the parameter changing part 84.

The parameter changing part 84 has a function of changing a moving object detection parameter used when the moving object detection part 82 detects a moving object in video data, based on environment information collected by the environment information collection part 83. The parameter changing part 84 receives environment information from the environment information collection part 83. Then, the parameter changing part 84 changes a moving object detection parameter based on (an external environment represented by) the acquired environment information (e.g., so as to optimize a moving object detection parameter for the external environment). Consequently, a moving object detection parameter used when the moving object detection part 82 detects a moving object in video data is changed based on environment information collected by the environment information collection part 83.

Thus, the video analysis device 8 according to this exemplary embodiment includes the environment information collection part 83 and the parameter changing part 84. With such a configuration, the video analysis system 8 is capable of collecting environment information representing the external environment of a place where video data acquired by of the video image acquisition part 81 has been acquired, and changing a moving object detection parameter based on the collected environment information. In other words, the video analysis device 8 is capable of changing a moving object detection parameter used by the moving object detection part 82 in accordance with change of the external environment of a place where video data acquired by the video data acquisition part 81 has been acquired. As a result, it is possible to provide the video analysis device 8 that prevents the accuracy of detection of a moving object from being affected even if the environment of a place where video data acquired by the video data acquisition part 81 has been acquired changes and video data changes.

The abovementioned video analysis device 8 can be realized by installing a predetermined program in the video analysis device 8. To be specific, a program as another aspect of the present invention is a computer program for causing a video analysis device to function as: a video data acquisition part which acquires video data acquired by an external device from the external device; a moving object detection part which detects, in video data acquired by the video data acquisition part, a moving object moving in the video data by using a moving object detection parameter, which is a parameter for detecting a moving object; an environment information collection part which collects environment information representing the external environment of a place where the external device having acquired the video data; and a parameter changing part which changes a moving object detection parameter used when the moving object detection part detects a moving object, based on the environment information acquired by the environment information collection part.

Further, a method for video analysis executed by operation of the abovementioned video analysis device 8 is a method including: collecting environment information representing the external environment of a place where an external device acquiring video data is installed; changing a moving object detection parameter used when detecting a moving object in video data, based on the collected environment information; and detecting, in video data acquired by an external device, the moving object moving in the video data by using the changed moving object detection parameter.

The invention of a program or a video analysis method having the abovementioned configurations has the same actions as the video analysis device 8, and therefore, can achieve the object of the present invention described above.

Supplementary Notes

The whole or part of the exemplary embodiments disclosed above can be described as the following supplementary notes. Below, the outline of the video analysis system and so on according to the present invention will be described. However, the present invention is not limited to the following configurations.

Supplementary Note 1

A video analysis system comprising:
a video data acquiring means for acquiring video data;
a moving object detecting means for detecting a moving object from video data by using a moving object detection parameter, the video data having been acquired by the video data acquiring means, the moving object detection parameter being a parameter for detecting a moving object;

an environment information collecting means for collecting environment information representing an external environment of a place where the video data acquiring means is installed; and a parameter changing means for changing the moving object detection parameter on a basis of the environment information collected by the environment information collecting means, the moving object detection parameter being used when the moving object detecting means detects the moving object.

According to this configuration, the video analysis system includes the environment information collecting means and the parameter changing means. Such a configuration enables the video analysis system to collect environment information representing the external environment of a place where the video data acquiring means is installed and change the moving object detection parameter based on the collected environment information. In other words, such a configuration enables the video analysis system to change the moving object detection parameter used by the moving object detecting means in accordance with change of the external environment of the place where the video data acquiring means is installed. As a result, it is possible to provide the video analysis system which prevents the accuracy of detection of a moving object from being affected even when the environment of the place where the video data acquiring means is installed changes and video data changes.

Supplementary Note 2

The video analysis system according to Supplementary Note 1, wherein:

the moving object detecting means is configured to detect the moving object by obtaining a difference of image data extracted from the video data and includes a sensitivity threshold as one of moving object detection parameters, the sensitivity threshold being a predetermined threshold to become a criterion for recognizing a disparity between image data of a previous frame and image data of a current frame; and the parameter changing means changes the sensitivity threshold on a basis of the environment information collected by the environment information collecting means, the sensitivity threshold being one of the moving object detection parameters.

According to this configuration, the video analysis system includes the sensitivity threshold as one of the moving object detection parameters. Such a configuration enables the video analysis system to change the sensitivity threshold in accordance with the external environment of a place where the video data acquiring means is installed. In other words, such a configuration enables the video analysis system to change the criterion for recognizing a disparity of image data when obtaining a difference of image data extracted from video data, in accordance with the external environment. As a result, it is possible to provide the video analysis system 1 which more reliably prevents the accuracy of detection of a moving object from being affected even when the environment of the place where the video data acquiring means is installed changes and video data changes.

Supplementary Note 3

The video analysis system according to Supplementary Note 1 or 2, wherein:

the moving object detecting means is configured to use a predetermined filter when detecting the moving object from the video data and includes a moving object distinction threshold as one of moving object detection parameters, the predetermined filter being for removing a moving object other than a detection target object from a detection target, the detection target object being a target to be detected, the moving object distinction threshold being a predetermined threshold used when the predetermined filter distinguishes the detection target object from the moving object other than the detection target object; and the parameter changing means changes the moving object distinction threshold on a basis of the environment information collected by the environment information collecting means, the moving object distinction threshold being one of the moving object detection parameters.

According to this configuration, the video analysis system includes the moving object distinction threshold as one of the moving object detection parameters. Such a configuration enables the video analysis system 1 to change the moving object detection threshold in accordance with the external environment of a place where the monitoring camera 2 is installed. In other words, such a configuration enables the video analysis system 1 to change the criterion used when the filter for removing a moving object other than a detection target object from the target of detection distinguishes a detection target object from a moving object other than the detection target object, in accordance with the external environment. As a result, it is possible to provide the video analysis system 1 which more reliably prevents the accuracy of detection of a moving object from being affected even when the environment of the place where the monitoring camera is installed changes and video data changes.

Supplementary Note 4

The video analysis system according to Supplementary Note 3, wherein:

the moving object detecting means is configured to use a reciprocating object removal filter when detecting the moving object from the video data and includes a reciprocating object removal threshold as one of the moving object distinction parameters, the reciprocating object removal filter being configured to regard a reciprocating object as the moving object other than the detection target object and remove the reciprocating object from the detection target, the reciprocating object performing predetermined reciprocation, the predetermined reciprocation being a repetitive movement, the reciprocating object removal threshold being a threshold used when the reciprocating object removal filter distinguishes the detection target object from the reciprocating object; and the parameter changing means changes the reciprocating object removal threshold on a basis of the environment information collected by the environment information collecting means, the reciprocating object removal threshold being one of the moving object detection parameters.

According to this configuration, the video analysis system includes the reciprocating object removal threshold as one of the moving object distinction thresholds. Such a configuration enables the video analysis system to change the reciprocating object removal threshold in accordance with the external environment of a place where the video data acquiring means is installed. In other words, such a configuration enables the video analysis system to change the criterion used when the filter for removing a moving object other than a detection target object, that is, removing a reciprocating object from the target of detection distinguishes a detection target object from a moving object other than the detection target object, that is, from a reciprocating object, in accordance with the external environment. As a result, it is possible to provide the video analysis system which more reliably prevents the accuracy of detection of a moving object from being affected even when the environment of the place where the video data acquiring means is installed changes and video data changes.

Supplementary Note 5

The video analysis system according to Supplementary Note 4, wherein:
the environment information collecting means is configured to collect wind speed information as the environment information, the wind speed information representing a wind speed; and
the parameter changing means changes the reciprocating object removal threshold in accordance with the wind speed represented by the wind speed information collected by the environment information collecting means, the reciprocating object removal threshold being one of the moving object detection parameters.

Supplementary Note 6

The video analysis system according to any of Supplementary Notes 3 to 5, wherein:
the moving object detecting means is configured to use a shadow removal filter when detecting the moving object from the video data and includes a shadow removal threshold as one of moving object distinction parameters, the shadow removal filter being configured to regard a predetermined shadow as the moving object other than the detection target object and remove the predetermined shadow from the detection target, the shadow removal threshold being a threshold used when the shadow removal filter distinguishes the detection target object from the predetermined shadow; and
the parameter changing means changes the shadow removal threshold on a basis of the environment information collected by the environment information collecting means, the shadow removal threshold being one of the moving object detection parameters.
According to this configuration, the video analysis system includes the shadow removal threshold as one of the moving object distinction thresholds. Such a configuration enables the video analysis system to change the shadow removal threshold in accordance with the external environment of a place where the video data acquiring means is installed. In other words, such a configuration enables the video analysis system to change the criterion used when the filter for removing a moving object other than a detection target object, that is, removing a shadow from the target of detection distinguishes a detection target object from a moving object other than the detection target object, that is, from a shadow, in accordance with the external environment.

Supplementary Note 7

The video analysis system according to Supplementary Note 6, wherein:
the environment information collecting means is configured to collect time information as the environment information, the time information representing time; and
the parameter changing means changes the shadow removal threshold in accordance with the time represented by the time information collected by the environment information collecting means, the shadow removal threshold being one of the moving object detection parameters.

Supplementary Note 8

The video analysis system according to any of Supplementary Notes 1 to 7, further comprising a parameter set storing means for storing a predetermined set of the moving object detection parameters as a parameter set, the predetermined set of the moving object detection parameters being corresponding to a possible external environment,
wherein the parameter changing means changes the moving object detection parameters, on a basis of the environment information collected by the environment information collecting means, by using the parameter set corresponding to the external environment represented by the environment information.
According to this configuration, the video analysis system includes the parameter set storing means, and is configured to change the moving object detection parameters by using a parameter set corresponding to an external environment represented by environment information. Such a configuration enables the video analysis system to select a possible external environment appropriate to the external environment represented by the environment information. Moreover, such a configuration enables the video analysis system to change the moving object detection parameters by using a parameter set corresponding to the selected possible external environment. As a result, it is not necessary to consider change of the individual moving object detection parameters in accordance with the external environment represented by the environment information, and it is possible to achieve reduction of the load for changing the moving object detection parameters.

Supplementary Note 9

The video analysis system according to any of Supplementary Notes 1 to 8, wherein the environment information is at least one of: luminance; time and date; meteorological information; and latitude and longitude.

Supplementary Note 10

A video analysis device comprising:
a video data acquisition part configured to acquire video data from an external device, the video data having been acquired by the external device;
a moving object detection part configured to detect a moving object from video data by using a moving object detection parameter, the video data having been acquired by the video data acquisition part, the moving object detection parameter being a parameter for detecting a moving object;
an environment information collection part configured to collect environment information representing an external environment of a place where the external device having acquired the video data is installed; and
a parameter changing part configured to change the moving object detection parameter on a basis of the environment information collected by the environment information collection part, the moving object detection parameter being used when the moving object detection part detects the moving object.

Supplementary Note 11

The video analysis device according to Supplementary Note 10, wherein:
the moving object detection part is configured to detect the moving object by obtaining a difference of image data extracted from the video data and includes a sensitivity threshold as one of moving object detection parameters, the sensitivity threshold being a predetermined threshold to become a criterion for recognizing a disparity between image data of a previous frame and image data of a current frame; and
the parameter changing part changes the sensitivity threshold on a basis of the environment information of the place where the external device having acquired the video data is installed, the sensitivity threshold being one of the moving object detection parameters.

Supplementary Note 12

The video analysis device according to Supplementary Note 10 or 11, wherein:
the moving object detection part is configured to use a predetermined filter when detecting the moving object from the video data and includes a moving object distinction threshold as one of moving object detection parameters, the predetermined filter being for removing a moving object other than a detection target object from a detection target, the detection target object being a target of detection, the moving object distinction threshold being a predetermined threshold used when the predetermined filter distinguishes the detection target object from the moving object other than the detection target object; and
the parameter changing part changes the moving object distinction threshold on a basis of the environment information of the place where the external device having acquired the video data is installed, the moving object distinction threshold being one of the moving object detection parameters.

Supplementary Note 13

The video analysis device according to Supplementary Note 12, wherein:
the moving object detection part is configured to use a reciprocating object removal filter when detecting the moving object from the video data and includes a reciprocating object removal threshold as one of the moving object distinction parameters, the reciprocating object removal filter being configured to regard a reciprocating object as the moving object other than the detection target object and remove the reciprocating object from the detection target, the reciprocating object performing predetermined reciprocation, the predetermined reciprocation being a repetitive movement, the reciprocating object removal threshold being a threshold used when the reciprocating object removal filter distinguishes the detection target object from the reciprocating object; and
the parameter changing part changes the reciprocating object removal threshold on a basis of the environment information of the place where the external device having acquired the video data is installed, the reciprocating object removal threshold being one of the moving object detection parameters.

Supplementary Note 14

The video analysis device according to Supplementary Note 12 or 13, wherein:
the moving object detection part is configured to use a shadow removal filter when detecting the moving object from the video data and includes a shadow removal threshold as one of the moving object distinction parameters, the shadow removal filter being configured to regard a predetermined shadow as the moving object other than the detection target object and remove the predetermined shadow from the detection target, the shadow removal threshold being a threshold used when the shadow removal filter distinguishes the detection target object from the predetermined shadow; and
the parameter changing part changes the shadow removal threshold on a basis of the environment information of the place where the external device having acquired the video data is installed, the shadow removal threshold being one of the moving object detection parameters.

Supplementary Note 15

The video analysis device according to any of Supplementary Notes 10 to 14, further comprising a parameter set storage part configured to store a predetermined set of the moving object detection parameters as a parameter set, the predetermined set of the moving object detection parameters being corresponding to a possible external environment,
wherein the parameter changing part changes the moving object detection parameters, on a basis of the environment information of the place where the external device having acquired the video data is installed, by using the parameter set corresponding to an external environment represented by the environment information.

Supplementary Note 16

The video analysis device according to any of Supplementary Notes 10 to 15, wherein the environment information is at least one of: luminance; time and date; meteorological information; and latitude and longitude.

Supplementary Note 17

A video analysis method comprising:
collecting environment information and changing a moving object detection parameter on a basis of the collected environment information, the environment information representing an external environment of a place where an external device acquiring video data is installed, the moving object detection parameter being used when detecting a moving object from the video data; and
detecting the moving object from the video data by using the changed moving object detection parameter, the video data being acquired from the external device.

Supplementary Note 18

The video analysis method according to Supplementary Note 17, comprising:
changing a sensitivity threshold on a basis of the environment information of the place where the external device acquiring the video data is installed, the sensitivity threshold being used as one of moving object detection parameters, the sensitivity threshold being a predetermined threshold to become a criterion for recognizing a disparity between image data of a previous frame and image data of a current frame; and obtaining a difference of image data extracted from the video data by using the changed sensitivity threshold, and detecting the moving object.

Supplementary Note 19

The video analysis method according to Supplementary Note 18, comprising:
changing a moving object distinction threshold on a basis of the environment information of the place where the external device acquiring the video data is installed, the moving object distinction threshold being used as one of the moving object detection parameters, the moving object distinction threshold being a predetermined threshold used when distinguishing a detection target object to become a target of detection from a moving object other than the detection target object; and
by using the changed moving object distinction threshold, removing the moving object other than the detection target object from a detection target when detecting the moving object from the video data.

Supplementary Note 20

The video analysis method according to any of Supplementary Notes 17 to 19, wherein the environment information is at least one of: luminance; time and date; meteorological information; and latitude and longitude.

Supplementary Note 21

A computer program including instructions for causing a video analysis device to function as:
a video data acquisition part configured to acquire video data from an external device, the video data being acquired by the external device;
a moving object detection part configured to detect a moving object from video data by using a moving object detection parameter, the moving object moving in the video data, the video data being acquired by the video data acquisition part, the moving object detection parameter being a parameter for detecting a moving object;
an environment information collection part configured to collect environment information representing an external environment of a place where the external device having acquired the video data is installed; and
a parameter changing part configured to change the moving object detection parameter on a basis of the environment information acquired by the environment information collection part, the moving object detection parameter being used when the moving object detection part detects the moving object.

The program described in the exemplary embodiments and the supplementary note is stored in the storage device or recorded on a computer-readable medium. For example, the recording medium is a portable medium such as a flexible disk, an optical disk, a magnet-optical disk and a semiconductor memory.

Although the present invention has been described above referring to the exemplary embodiments, the present invention is not limited to the exemplary embodiments. The configurations and details of the present invention can be changed and modified in various manners that can be understood by one skilled in the art within the scope of the present invention.

This application is based upon and claims the benefit of priority from Japanese patent application No. 2014-026465, filed on Feb. 14, 2014, the disclosure of which is incorporated herein in its entirety by reference.

DESCRIPTION OF REFERENCE NUMERALS 1, 6, 7 video analysis system
2 monitoring camera
3 environment information collecting means
31 calendar
32 Web
33 various sensors
4, 5 video analysis device
41 video analyzing means
42 parameter changing means
43 analysis result displaying means
51 optimum parameter determining means
52 parameter set storing means
53 setting updating means
71 video data acquiring means
72 moving object detecting means
73 environment information collecting means
74 parameter changing means
81 video data acquisition part
82 moving object detection part
83 environment information collection part
84 parameter changing part

The invention claimed is:
1. A video analysis system comprising:
at least one memory storing instructions; and
at least one processor executing the instructions to perform;
acquiring video data acquired at a predetermined location;
detecting a moving object from the video data by using a moving object detection parameter, the moving object detection parameter being a parameter for detecting a moving object; and
collecting environment information for specifying one or more causes making a shadow; wherein
the at least one processor further performs;
removing the shadow from the moving object, using a shadow removal threshold to distinguish the moving object from the shadow; and
changing the shadow removal threshold representing a length or a density of the shadow, in accordance with the environment information including information representing time or date.

2. The video analysis system according to claim 1, wherein the shadow removal threshold represents an amount indicating a length or a density of the shadow.

3. The video analysis system according to claim 1, wherein the environment information includes the time or the date when the video data is acquired.

4. The video analysis system according to claim 1, wherein the environment information includes latitude and longitude where the video data is acquired.

5. The video analysis system according to claim 1, wherein the environment information includes the weather when the video data is acquired.

6. The video analysis system according to claim 1, wherein the environment information includes the luminance collected when the video data is acquired.

7. A video analysis method comprising:
acquiring video data acquired at a predetermined location;
detecting a moving object from the video data by using a moving object detection parameter, the moving object detection parameter being a parameter for detecting a moving object; and collecting environment information for specifying one or more causes making a shadow; wherein the at least one processor further performs;

removing the shadow from the moving object, using a shadow removal threshold to distinguish the moving object from the shadow; and changing the shadow removal threshold representing a length or a density of the shadow, in accordance with the environment information including information representing time or date.

8. The video analysis method according to claim 7, wherein the shadow removal threshold represents an amount indicating a length or a density of the shadow.

9. The video analysis method according to claim 7, wherein the environment information includes the time or the date when the video data is acquired.

10. The video analysis method according to claim 7, wherein the environment information includes latitude and longitude where the video data is acquired.

11. The video analysis method according to claim 7, wherein the environment information includes the weather when the video data is acquired.

12. The video analysis method according to claim 7, wherein the environment information includes the luminance collected when the video data is acquired.

13. A non-transitory computer-readable storage medium storing a program causing a computer to perform:

acquiring video data acquired at a predetermined location;

detecting a moving object from the video data by using a moving object detection parameter, the moving object detection parameter being a parameter for detecting a moving object; and collecting environment information for specifying one or more causes making a shadow; wherein the at least one processor further performs;

removing the shadow from the moving object, using a shadow removal threshold to distinguish the moving object from the shadow; and changing the shadow removal threshold representing a length or a density of the shadow, in accordance with the environment information including information representing time or date.

14. The non-transitory computer-readable storage medium according to claim 13, wherein the shadow removal threshold represents an amount indicating a length or a density of the shadow.

15. The non-transitory computer-readable storage medium according to claim 13, wherein the environment information includes the time or the date when the video data is acquired.

16. The non-transitory computer-readable storage medium according to claim 13, wherein the environment information includes latitude and longitude where the video data is acquired.

17. The non-transitory computer-readable storage medium according to claim 13, wherein the environment information includes the weather when the video data is acquired.

18. The non-transitory computer-readable storage medium according to claim 13, wherein the environment information includes the luminance collected when the video data is acquired.

\* \* \* \* \*